United States Patent [19]

Shimamura et al.

[11] 3,922,402

[45] Nov. 25, 1975

[54] PRODUCTION OF ARTIFICIAL LEATHER

[75] Inventors: Hidehiko Shimamura; Hirozo Fujita, both of Kurashiki, Japan

[73] Assignee: Kuraray Co., Ltd., Kurashiki, Japan

[22] Filed: Mar. 29, 1974

[21] Appl. No.: 456,100

[30] Foreign Application Priority Data

May 7, 1973 Japan.................. 48-51031

[52] U.S. Cl. ............ 427/336; 427/412; 428/424; 428/425; 428/904
[51] Int. Cl.² ............................................ B44D 1/14
[58] Field of Search............ 117/76 F, 76 FB, 76 T, 117/138.8 N, 140 A, 63, 135.5; 161/DIG. 2, 89, 158, 159, 170, 190; 427/412, 336; 428/424, 425, 904

[56] References Cited
UNITED STATES PATENTS

| | | | |
|---|---|---|---|
| 3,481,766 | 12/1969 | Craven et al.............. | 117/76 T |
| 3,481,767 | 12/1969 | Craven et al.............. | 117/76 T |
| 3,503,784 | 3/1970 | Morita et al............... | 117/62.2 |
| 3,619,257 | 11/1971 | Fulcada et al............. | 117/76 T |
| 3,632,417 | 1/1972 | Brasen...................... | 117/76 X |
| 3,663,351 | 5/1972 | Murphy...................... | 161/159 |
| 3,841,897 | 10/1974 | Okazalei et al............ | 117/76 T |

*Primary Examiner*—Michael R. Lusignan
*Attorney, Agent, or Firm*—Kaufman & Kramer

[57] ABSTRACT

A method for preparing artificial leathers having different polyurethane elastomers in the surface layer and in the substrate is disclosed. In one embodiment, the method involves the application of an intermediate layer containing both elastomers. In another embodiment, the method involves the application of an intermediate layer containing either both elastomers or the surface elastomer only; this embodiment involves an additional drying step prior to application of the surface layer.

11 Claims, No Drawings

PRODUCTION OF ARTIFICIAL LEATHER

This invention relates to methods for the production of artificial leather, comprising a surface layer of polymer comprised principally of a polyurethane elastomer on a substrate comprised principally of a fibrous mat and a polyurethane polymer different from that used in the surface layer.

It is well known to produce a microporous artificial leather by impregnating a polymer solution consisting principally of a polyurethane elastomer into a fibrous mat to obtain a substrate, then coating on the substrate a solution of polymer consisting principally of the same polyurethane elastomer as used in the impregnation of the fibrous mat, and finally coagulating the coated substrate by treatment with a solvent which is a non-solvent for the polyurethane elastomer but which is miscible with the solvent used for the solution of the polyurethane. Furthermore, in order to obtain an artificial leather of good quality, it is also known that process conditions should be employed which, on the one hand, coagulate the polyurethane-impregnated mat into a microporous sponge with natural leather-like characteristics, and on the other hand coagulate the polyurethane elastomer used on the surface of the mat into a microporous surface having such properties as good flexing fatigue resistance, high light stability, strong anti-degradative ability, solvent-proof ability, nice heat resistance and high moisture permeability. It is preferable to use different polyurethane elastomers for impregnation into the fibrous mat and for coating the impregnated substrate to form a surface layer. However, in this case, since their behaviors of various polyurethane elastomers on coagulation and their affinities are different, it is difficult to obtain an artificial leather with an intimately continuous porous structure between the substrate and the surface layer. Thus, the layers of artificial leather prepared from two different polyurethane elastomers have a tendency to separate.

In order to overcome this defect, a conventional method is known which provides that, after the preparation of the substrate and the surface layer respectively, they are attached to each other with an adhesive. However, in this method, even though the resistance to separation of the surface layer from the substrate is increased, the moisture permeability of the resulting artificial leather is low. Moreover, the process for production is rather tedious and troublesome.

After an extensive study to resolve the difficulties mentioned above in the method of production of artificial leather which has different polyurethane elastomers in the substrate and in the surface layer, we have developed the process described herein. According to the present invention, artificial leathers are prepared which have a surface layer of a polymer consisting principally of a polyurethane elastomer (hereinafter referred to as "B-polymer") which is different from the polyurethane elastomer (hereinafter referred to as "A-polymer") used in the substrate, which is composed of a fibrous mat impregnated with polymer mainly consisting principally of A-polymer. These artificial leathers are characterized by their large peeling strength between the layers (resistance to separation) and their superior permeability to moisture and gases. They are prepared by a new process having two general embodiments. In the first embodiment, a solution or a dispersion liquid of polymer consisting principally of A-polymer is impregnated into a fibrous mat; a solution or a dispersion liquid of polymer consisting principally of both A- and B-polymers is coated on the impregnated mat; then a solution or a dispersion liquid of polymer consisting principally of B-polymer is coated thereon; and, lastly, the coated substance is coagulated. In the second embodiment, the fibrous mat, after impregnation with a solution or a dispersion liquid of polymer consisting principally of A-polymer is coagulated, it is then coated with a solution or a dispersion liquid of polymer consisting principally of B-polymer and/or A-polymer and is coagulated by drying; then, a solution or a dispersion liquid of polymer consisting principally of B-polymer is coated thereon; and lastly, the coated substance is coagulated in a coagulating bath. The advantage of the present invention is that it affords one the choice of any proper polyurethane elastomer which gives the desired properties of the surface layer as well as those of the substrate, without incurring the disadvantages heretofore encountered.

Polyurethane elastomers used in this invention are those obtained from polymer glycol esters or ethers whose molecular weight is more than 500, an organic diisocyanate and a molecular-chain extender having at least two active hydrogen atoms at its molecular ends. Examples for polymer glycols of esters or ethers are polyethylene either glycol, polypropylene ether glycol, polytetramethylene ether glycol, polyhexamethylene ether glycol, polyethylene adipate glycol, polypropylene adipate glycol, polyethylene-propylene adipate glycol, polybutylene adipate glycol, polypentamethylene adipate glycol, polyhexamethylene adipate glycol, polycaprolactone glycol, and polyethylene sebacate glycol, etc. Polycaprolactone glycol can be prepared by a ring-opening polymerization of ε-caprolactone. As organic diisocyanates, 4,4'-diphenyl methane diisocyanate, tolylene diisocyanate, naphthylene diisocyanate, xylylene diisocyanate, hexamethylene diisocyanate, cyclohexyl diisocyanate and phenylene diisocyanate, etc., are used. As chain extenders having more than two active hydrogen atoms in their molecular ends, hydrazine, hydrazine hydrate, ethylene diamine, hexamethylene diamine, p,p'-diamino-phenyl methane, ethylene glycol, propylene glycol, butylene glycol, pentamethylene glycol, diethylene glycol, hexamethylene glycol, N-methyl diethanol amine and p,p'-diphenylol alkane, etc. are used. The polyurethane elastomer mentioned above can be mixed with other polymers, the amount of other polymers being less than 50 weight %. The polymer to be mixed with the polyurethane elastomer must have an affinity with the polyurethane elastomer; examples are polyvinyl chloride, polyurea, polyvinyl formal, polymethyl acrylate, polymethyl methacrylate, polyvinyl alcohol, polyacrylonitrile, polyvinyl acetate, cellulose derivatives, co-polymer of vinylidene chloride and acrylonitrile, copolymer of vinyl chloride and vinyl acetate, and natural or synthetic rubbers.

As a solvent to prepare a solution or a dispersion liquid of polymer consisting principally of polyurethane elastomer used in the present invention for making a substrate and a surface layer and an intermediate layer between them, examples are dimethyl formamide, dimethyl acetamide, diethyl formamide, dimethyl sulfoxide, dioxane and tatrahydrofuran. As a diluent to a solution or to a dispersion liquid of polymer, ketones such as acetone, methyl ethyl ketone and cyclohexanone, alcohols, ethyl acetate, butyl acetate, toluene, hexane, phenol, butyl carbinol and chloroform, etc., can be used. Furthermore, to the polymer solution or to the polymer dispersion liquid, coloring materials such as carbon black, titanium dioxide, dyes and pigments, fillers, stabilizers, coagulation controlling agents, etc., can be also added. As coagulation controlling agents, such surface active agents as sorbitane monostearate, sorbitane octadecyl urethane, higher aliphatic alcohols having 12 to 24 carbon atoms, higher aliphatic carboxylic acids having 12 to 24 carbon atoms and glycerol are examples.

As fibrous mats for making substrates for use in the present invention, needle punched non-woven fabrics, multi-layer non-woven fabrics, woven fabrics and knitted fabrics, etc. are used. As fibers for fibrous mats, examples are conventional fibers, synthetic fibers with a special cross-sectional figure, highly shrinkable fibers, composited fibers having more than two components with a special cross-sectional structure where a component is distributed in a plurality of fine filaments in the other components, bundle-type fibers of fine denier, fibers with oriented multi-holes, and blended fibers of them. Among them, fine denier fibers, bundle-type fibers and fibers with oriented multi-holes can be prepared by dissolving away one component from special fibers with a special cross-sectional structure where one component is distributed in a plurality of fine filaments in the other components which can be obtained by the spinning of a polymer of more than two components having different solubility in the solvent. For example, if one component which is not distributed as fine filaments is dissolved away from the special fiber mentioned above with a special cross-sectional structure, a bundle-type of fine denier fiber may be produced; on the other hand, if the other component which is distributed as fine filaments is dissolved away, a fiber with oriented multi-holes may be produced.

In the present invention, the following two general methods are available after the impregnation of a solution or a dispersion liquid of polymer consisting principally of A-polymer to a fibrous mat. The first general method is to coat on the impregnated mat a solution or a dispersion liquid of polymer consisting principally of a mixture of A- and B-polymers, then to coat a solution or a dispersion liquid of polymer principally consisting of B-polymer on it, and finally to coagulate it in a coagulating bath. This first general method will hereinafter be referred to as the "wet process". The second general method is to coagulate in a coagulating bath a fibrous mat impregnated with a solution or a dispersion liquid of polymer consisting principally of A-polymer, a solution or a dispersion liquid of polymer consisting principally of B-polymer or/and A-polymer is coated thereon and coagulated by drying; then, a solution or a dispersion liquid of polymer consisting principally of B-polymer is coated thereon and the coated substance is coagulated in a coagulating bath. This second general method will hereinafter be referred to as the "dry process".

In case of the wet process of the present invention, the amount of the solution or dispersion liquid of polymer consisting principally of a mixture of A- and B-polymers is about 2 to 110 g/m² of preferably 8 to 60 g/m², each based upon the solid polymer content. The concentration of the polymer in the solution or in the dispersion liquid is preferable from 5 to 30 weight %. The desirable ratio of A- and B-polymers is about 65 - 2 / 35 - 98 in weight represented in the ratio of A/B. Furthermore, in order to get a mixture of them, it is desirable to mix solutions of A- and B-polymers which were prepared separately by polymerization. It is also possible to obtain the mixture by a polymerization of a mixture containing more than two kinds of soft segments in urethane polymerization so as to fit the desired mixing ratio of A- and B-polymers. Here, different kinds of polyurethane elastomers will result from differences in polymer glycols as soft segment in urethane polymerization, or the difference in composition of the three components, polymer glycol, organic polyisocyanate and chain extender, in urethane polymerization, or the difference in the kind of organic polyisocyanate, or the difference in the kind of chain extender.

In practicing the dry process of the present invention, a solution or a dispersion liquid of a polymer mixture, consisting principally of B-polymer or/and A-polymer is coated on a fibrous mat impregnated with a polymer consisting principally of A-polymer and the coated substrate is dried before the step of coating with a solution or a dispersion of polymer consisting principally of B-polymer. It is not necessary that all of the solvent be removed in the drying step, but at least 50%, preferably more than 80% of the amount solvent applied initially should be removed. If the residual amount of the solvent is too much after the drying, the effect of the present invention will not operate effectively, since the coated polymer liquid for surface coating of the mat in the next step will permeate easily into the substrate. The amount of the solution or dispersion liquid of the polymer applied as an intermediate layer between the substrate and the surface coating layer is about 0.1 g/m² to 30 g/m² or more, preferably 0.5 g/m² to 15 g/m², based upon solid polymer content. The concentration of the solution or dispersion liquid of said polymers is preferably from about 5 weight % to 30 weight %.

In the specification of the present invention, the step of coagulation in a coagulating bath refers to an operation to coagulate a solution or a dispersion liquid of a polymer mixture with a solvent which is miscible with the solvent of the polymer but does not dissolve the polymer itself or the fiber used as a mat for the substrate. Practical examples for coagulating bath solvents are water, methanol, isopropanol and toluene, etc., or mixtures of them. Mixtures of solvent and non-solvent to polymer, for example, a mixture of dimethyl formamide and water, are also desirable coagulating agents, since it becomes possible to adjust the porous sponge structure of polymer layer delicately by changing the mixture ratio of solvent and non-solvent.

The invention is illustrated in the following examples, which are here included for illustrative purposes only and not as limitations. Unless otherwise indicated, all parts and percentages are by weight.

EXAMPLE 1

A non-woven fabric of 360 g/m² weight was prepared, using nylon staple fiber of 4 deniers and 50 mm of cut length, and forming it into a web by a random webber and needle punching it in an ordinary manner. A solution of a polymer mixture was prepared, mixing 200 parts of polyurethane elastomer solution in dimethylformamide at the concentration of 30% polymer content. The polymer was obtained by a polymerization of a mixture consisting of 1 mol of polyethylene adipate whose molecular weight was 1500, 5 mols of diphenyl methane-4,4'-diisocyanate and 4 mols of ethylene glycol in dimethylformamide, 10 parts of polyacrylonitrile resin, 10 parts of water, 6 parts of sorbitane mono-stearate, 7 parts of stearyl alcohol and 30 parts of dimethyl formamide. The viscosity of the solution was 190 poises at 30°C. The solution was impregnated into said non-woven fabric. Next, a dimethylformamide solution of a two-polymer mixture whose concentration was 25% was prepared by mixing a (1) dimethylformamide solution of a polyurethane elastomer obtained by polymerization of 1 mol of polycaprolactone whose molecular weight was 1500, 4 moles of diphenyl methane 4,4'-diisocyanate and 3 mols of ethylene glycol and (2) the solution of the polyurethane elastoner used in the preceding step in the mixing ratio of 65:35 based upon each polymer content. The resulting solution of two polymers was coated on the said non-woven fabric impregnated as mentioned above, in the amount of 120 g/m$^2$ based upon dry polymer. Then, a surface coating solution with a viscosity of 75 poises at 30°C was prepared mixing 250 parts of the said polyurethane elastomer solution of polycaprolactone polymer at a concentration of 30% in dimethylformamide, 7 parts of carbon black powder, 6 parts of stearyl alcohol and 35 parts of dimethyl formamide, and this was coated on the fabric in a thickness of 1.1 mm. The fabric was immersed in an aqueous solution of dimethyl formamide of 35% concentration for 10 minutes at 25°C to coagulate the polyurethane elastomers and then was sufficiently desolvated, and afterwards dried. The treated sheet material, after coloring with a lacquer for leather use by spraying on its surface and embossing by an emboss roll, was an artificial leather having a superior surface scar resistance property and a high moisture permeability.

The observed peeling strength between the coated layer and the impregnated non-woven fabric layer was 5.6 kg/2.5 cm of width and the moisture permeability (evaluated according to JIS-K-6549) was 1400 g/m$^2$/24 hrs. This artificial leather is of suitable character for use as a shoe upper material.

For comparison, a sheet material was prepared by coating the said surface coating solution directly on the surface of the impregnated non-woven fabric without using the intermediate two-polymer coating solution of the polyurethane elastomer mixture mentioned above. Coagulation and drying were performed in the same way. The sheet material obtained showed a low peeling strength between coated layer and the impregnated non-woven layer, namely 0.6 kg/2.5 cm of width. Separation between two layers occurred when the sheet was used as a shoe upper material.

EXAMPLE 2

A needle punched non-woven fabric of polyester fiber was impregnated with the same polyurethane elastomer as in Example 1. A two-polymer solution in dimethyl formamide was prepared from (1) 200 parts of a 30% dimethyl formamide solution of polyurethane elastomers obtained by mixing a polyurethane elastomer, prepared from 1 mol of polytetramethylene glycol whose molecular weight was 1000, 3 mols of diphenylmethane-4,4'-diisocyanate and 2 mols of propyleneglycol, and (2) the polyurethane elastomer solution used for impregnation of the fabric, in a ratio of 90:10 based upon polymer content, 5 parts of cellulose octadecyl urethane and 15 parts of dimethyl formamide. The two-polymer solution was coated on the impregnated non-woven fabric in an amount of 70 g/m$^2$ of the solution by a reverse roll coater. Then, a surface coating solution of 40 poises viscosity at 30°C was prepared from 200 parts of a dimethyl formamide solution containing 30% of a polyurethane elastomer obtained from 1 mol of polytetramethylene glycol whose molecular weight was 1000, 3 mols of diphenylmethane-4,4'-diisocyanate and 2 mols of propylene glycol, 3 parts of a pigment, 6 parts of stearyl alcohol and 100 parts of dimethyl formamide; this was then coated on the impregnated non-woven fabric in the thickness of 0.9 mm by a knife coater. The impregnated and coated fabric was immersed in a water at 50°C to coagulate it in a coagulating bath, and then it was washed with water and completely dried. The obtained sheet material was further finished with a coloring material containing pigment and embossed by an emboss roller. The final finished product of sheet material behaved en bloc smoothly, exhibited for excellent peeling strength between the surface layer and the substrate layer and had a durable flexing fatigue resistance, a good anti-degradative property and moreover, a large moisture permeability and good water-resisting properties.

EXAMPLE 3

As a substrate, a three-dimentional non-woven mat of 400 g/m$^2$ weight was prepared from a composite fiber with a 50 parts of nylon-6 and 50 parts of polystyrene. A dimethyl formamide solution composed of a polyurethane elastomer obtained from polyethylene adipate-diphenyl methane-4,4'-diisocyanate and 1,4-butane diol, a coagulation regulating agent, pigments and an extending agent, was impregnated into the non-woven mat. Next, a 25% polyurethane solution in dimethyl formamide prepared from mixing 40 parts of the said polyurethane elastomer of polyethylene adipate series and 60 parts of the polyurethane elastomer of polycaprolactone series, further adding a coagulation regulating agent, was coated on the impregnated non-woven mat in the amount of 50 g/m$^2$ based upon dry polyurethane elastomer. Then, a 20% polyurethane elastomer solution in dimethyl formamide of polycaprolactone series containing a coagulation regulating agent, pigments and light stabilizer, was coated on the non-woven mat in the amount of 150 g/m$^2$ based upon dry polyurethane elastomer. The coated fabric was then immersed in an aqueous coagulating bath containing 35% of dimethyl formamide. The polystyrene was extracted off and the sheet material was washed with water and dried. The sheet was further finished with a coloring agent containing a pigment, embossed and crumpled. The final product of sheet material had nice surface smoothness, good anti-degradative property, high light-resistance, large moisture permeability and superior workability.

EXAMPLE 4

A fibrous mat of 410 g/m$^2$ weight was prepared from nylon staple fiber of 45 mm of cut length and 6 deniers, by forming it into a web by a random webber and needle punching it. A solution of a polymer mixture in dimethyl formamide having a viscosity of 150 poises at 30°C was prepared by mixing 300 parts of a 26% polyurethane elastomer solution, where the polyurethane elastomer was prepared by an addition polymerization of 1 mol of polyethylene adipate whose molecular weight is 1500 and 3 mols of diphenyl methane-4,4'-diisocyanate in a dimethyl formamide solution and by extending its molecular chain length with 2 mols of butane diol, 30 parts of polyvinyl chloride, 15 parts of water, 72 parts of stearyl alcohol 54 parts of sorbitane monostearate and 24 parts of dimethyl formamide. Into this solution, the said fibrous mat was immersed and after removing an excess part of the polyurethane solution from the surface of the fibrous mat by a knife, it was immersed into an aqueous coagulating bath containing 10% of dimethyl formamide to coagulate it. After washing with water and drying a substrate sheet material of 2.1 mm thickness was obtained. A 20% polyurethane elastomer solution in dimethyl formamide, prepared by polymerization of 1 mol of polypropylene glycol having 2000 of molecular weight, 5 mols of diphenyl methane-4,4'-diisocyanate and 4 mols of ethylene glycol in dimethyl formamide, was coated on the said substrate sheet material in the amount of 10 g/m$^2$ of the solution by a marked roll used for gravure printing, and the sheet was dried for 5 minutes at 110°C in hot air. Then, on this polyurethane film layer coated on the substrate sheet material, a surface coating liquid of polyurethane elastomer having a viscosity of 90 poises at 30°C, which was prepared by mixing 250 parts of a 20% solution of the same polyurethane as that of the said polyurethane film layer prepared from 1 mol of polypropylene glycol, 5 mols of diphenyl-4,4'-diisocyanate and 4 mols of ethylene glycol, 6 parts of carbon black powder, 4 parts of stearyl alcohol and 15 parts of dimethyl formamide, was coated in 1.5 mm thickness by a pouring method.

The next step was the coagulation of the coated layer in water at 30°C. The sheet was washed with warm water and then dried at 105°C. in hot air. A soft sheet material of a microporous structure having a surface layer of 0.53 mm thickness was obtained. Further, the sheet was made into a leather-like sheet with a suede-like appearance by buffing off the upper portion of the surface layer with sand paper. The sheet material of this example showed a strong peeling strength between the surface layer and the substrate, namely 5.3 kg/2.5 cm of width, and had a superior moisture permeability, namely 2500 g/m$^2$/24 hrs.

For comparison, on a substrate sheet material prepared in the manner of Example 1, the surface coating solution mentioned above was coated in 1.5 mm thickness by the pouring method and then, the sheet was treated identically as mentioned above, including coagulation, washing, and drying. The obtained leather-like sheet material, after shaving off the upper portion of its surface layer, had a poor peeling strength between the surface layer and the substrate, namely 0.8 kg/2.5 cm of width. Separation between the coated surface layer and the substrate sheet material, occurred during a scratching test by a metallic edge; the material was therefore unfit for practical use.

EXAMPLE 5

A three dimensional non-woven mat of 300 g/m$^2$ of weight was prepared from a two-component composition of 40 parts of Nylon-6 and 60 parts of polystyrene both of which were 51 mm of cut length and 6 deniers. A polymer solution having a viscosity of 110 poises at 30°C. was prepared by mixing 250 parts of a 20% polyurethane elastomer solution in dimethyl formamide prepared from 1 mol of polyethylene propylene adipate having a molecular weight of 1000, 2.5 mols of tolylene diisocyanate and 1.5 mols of ethylene glycol in dimethyl formamide, 10 parts of water, 70 parts of cetyl alcohol, 50 parts of sorbitane monooleate and 15 parts of dimethyl formamide. The solution was impregnated into non-woven mat. The impregnated non-woven mat was immersed in a water at 40°C to coagulate it, washed with warm water and dried. A fibrous substrate of 1.6 mm thickness was thus obtained. A polyurethane elastomer solution was prepared from 100 parts of a 20% polyurethane elastomer solution obtained by polymerization of 1 mol of polytetramethylene glycol having a molecular weight of 2000, 6 mols of hexamethylene diisocyanate and 5 mols of butanediol in dimethyl formamide, 5 parts of polyacrylonitrile and 3 parts of sorbitane octadecyl urethane. This was coated on the said fibrous substrate in the amount of 40 g/m$^2$ of the solution by a doctor knife and then dried for 5 minutes at 130°C in a hot air stream dryer. Then, on the polyurethane elastomer surface layer coated on the substrate, a surface coating polyurethane elastomer solution having a viscosity of 50 poises at 30°C, consisting of 300 parts of a 20% polyurethane elastomer solution obtained by a polymerization of the same composition as used for preparation of the polyurethane elastomer applied to the said polyurethane elastomer film layer (namely, 1 mol of polytetramethylene glycol, 6 mols of hexamethylene diisocyanate and 5 mols of butanediol in dimethyl formamide), 10 parts of titanium dioxide powder, 8 parts of stearyl alcohol and 5 parts of light-stabilizer, was coated in 1.3 mm thickness by the pouring method. The coated sheet material was coagulated in a water at 30°C containing 20% of dimethyl formamide, washed with a warm water, and then dried at 110°C in hot air. A soft microporous sheet material having a surface layer on the fibrous substrate was obtained. This sheet was finished into a leather-like sheet having such superior properties as anti-yellowing, good leather-like feel, large moisture permeability and high peeling strength of coated layer, by spraying on it a clear lacquer solution for leather use and embossing it on an emboss roll.

For comparison, a sample sheet was prepared, in which the said surface coating solution was directly coated on the substrate used in the example mentioned above, without the use of any intermediate layer, and then the coated sheet was treated in the same manner as in this example. The prepared sample sheet showed weak peeling strength of the coated layer; it separated partly during the preparation process of warm water washing and drying, and of course, had no practical utility as an artificial leather.

What is claimed is:

1. A method of preparing an artificial leather which comprises a substrate containing as an A-polymer a polyurethane elastomer and a surface layer containing as a B-polymer a polyurethane elastomer different from the A-polymer, said method comprising the steps of (1) impregnating a solution or liquid dispersion containing the A-polymer in a fibrous mat, to give an A-polymer impregnated mat, (2) coating the impregnated mat with a solution or liquid dispersion containing a composition comprising the A-polymer and the B-polymer in a ratio of from about 65:35 to about 9:98, (3) applying a surface layer by coating the coated impregnated mat with a solution or liquid dispersion containing the B-polymer, and (4) coagulating the resulting coated impregnated mat produced in step (3).

2. A method according to claim 1 in which, in step 2, the polymer composition is supplied in sufficient amount so that from about 2 to about 110 grams of polyurethane elastomer are deposited per square meter of the surface area.

3. A method according to claim 2 in which from about 8 to about 60 grams of polyurethane elastomer are deposited per square meter of surface area.

4. A method according to claim 1 in which, in step 2, the total concentration of polymer in the solution or dispersion liquid is from about 5 to 30 weight percent.

5. A method according to claim 1 in which the substrate and surface layers each contain at most 50% of another and different polymer, said other and different polymer having an affinity for said A-polymer and said B-polymer.

6. A method of preparing an artificial leather which comprises a substrate containing as an A-polymer a polyurethane elastomer and a surface layer containing as a B-polymer a polyurethane elastomer different from the A-polymer, said method comprising the steps of (1) impregnating a solution or liquid dispersion containing the A-polymer in a fibrous mat, to give an A-polymer impregnated mat, (2) coagulating the impregnated mat, (3) coating the impregnated mat with a solution or liquid dispersion containing either a composition comprising the A-polymer and B-polymer in a ratio of from about 65:35 to about 2:98, or the B-polymer alone, (4) drying the coated impregnated mat, (5) applying a surface layer by coating the coated impregnated mat with a solution or liquid dispersion containing the B-ploymer and, (6) coagulating the resulting coated impregnated mat produced in step (3).

7. A method according to claim 6 in which, in step 2, the impregnated mat is dried sufficiently so that more than 80% of solvent is removed.

8. A method according to claim 6 in which, in step 3, sufficient polyurethane elastomer is used so as to provide a coating layer of from about 0.1 to about 30 grams per square meter of surface area.

9. A method according to claim 8 in which sufficient polyurethane elastomer is used so as to provide between about 0.5 and about 15 grams per square meter of surface area.

10. A method according to claim 6 in which, in step 3, the concentration of polyurethane elastomer in the solution or dispersion liquid is from about 5 weight percent to 30 weight percent.

11. A method according to claim 6 in which the substrate and surface layers each contain at most 50% of another and different polymer, said other and different polymer having an affinity for said A-polymer and said B-polymer.

* * * * *

UNITED STATES PATENT OFFICE
CERTIFICATE OF CORRECTION

Patent No. 3,922,402      Dated November 25, 1975

Inventor(s) Hidehiko Shimamura et al

It is certified that error appears in the above-identified patent and that said Letters Patent are hereby corrected as shown below:

Column 2, line 65, "tatrahydrofuran" should read --tetrahydrofuran--;

Column 4, line 50, "mixture" should read --mixing--;

Column 8, line 1, after "into" insert --the--;

Column 8, line 59, "9:98" should read --2:98--;

Column 10, line 2, "ploymer" should read --polymer--.

Signed and Sealed this

Twenty-eighth Day of September 1976

[SEAL]

Attest:

RUTH C. MASON
Attesting Officer

C. MARSHALL DANN
Commissioner of Patents and Trademarks